(12) United States Patent
Furuichi et al.

(10) Patent No.: US 7,624,427 B2
(45) Date of Patent: Nov. 24, 2009

(54) METHOD AND APPARATUS FOR SUPPORTING PERSONAL INFORMATION PROTECTION

(75) Inventors: Sanehiro Furuichi, Tokyo (JP); Michiharu Kudo, Kamakura (JP)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 11/684,359

(22) Filed: Mar. 9, 2007

(65) Prior Publication Data

US 2007/0250903 A1    Oct. 25, 2007

(30) Foreign Application Priority Data

Apr. 20, 2006    (JP)    .............................. 2006-116548

(51) Int. Cl.
G06F 17/00 (2006.01)
H04L 26/06 (2006.01)
(52) U.S. Cl. ............................................. 726/1; 705/1
(58) Field of Classification Search .................... 726/1
See application file for complete search history.

(56) References Cited

U.S. PATENT DOCUMENTS

| 3,860,870 | A  | * | 1/1975 | Furuya ....................... 370/204 |
| 4,013,962 | A  | * | 3/1977 | Beseke et al. ............... 455/135 |
| 7,161,465 | B2 | * | 1/2007 | Wood et al. ................. 340/5.2 |
| 7,234,065 | B2 | * | 6/2007 | Breslin et al. ............... 713/193 |
| 2005/0080716 | A1 | * | 4/2005 | Belyi et al. ................. 705/38 |
| 2005/0080717 | A1 | * | 4/2005 | Belyi et al. ................. 705/38 |
| 2006/0102717 | A1 | * | 5/2006 | Wood et al. ................. 235/382 |
| 2007/0143145 | A1 | * | 6/2007 | DeLusignan et al. ........... 705/2 |

FOREIGN PATENT DOCUMENTS

| JP | H11-338778 | 10/1999 |
| JP | 2002-330220 | 11/2002 |

(Continued)

OTHER PUBLICATIONS

Furuichi, S. "The Design and Implementation of Real-Time Program Monitoring . . . ". 2006 Symposium on Cryptography and Information Security. Hiroshima, Japan, Jan. 17-20, 2006.

(Continued)

*Primary Examiner*—Kambiz Zand
*Assistant Examiner*—Dant B Shaifer Harriman
(74) *Attorney, Agent, or Firm*—Fredrik Mollborn; Shimokaji & Associates, P.C.

(57) ABSTRACT

Methods and apparatus, including computer program products, implementing and using techniques for causing an application program containing personal information to operate on an operating system. It is detected whether the application program outputs, transfers or generates data to the outside of a storage region of the application program. A real-time determination is made as to whether or not the data is subject to personal information management. Processing of the application program is continued, interrupted or corrected based the determination. Personal information is detected by scanning contents of the data when the data is subject to personal information management. Detected personal information is displayed to a user. A result of the determination is input according to a level of risk against the data for the user. Contents of the determination result is stored as a history. A risk indicator for the data is computed and displayed to the user.

4 Claims, 10 Drawing Sheets

FOREIGN PATENT DOCUMENTS

| | | | |
|---|---|---|---|
| JP | 2004-192601 | | 7/2004 |
| JP | 2005-190066 | | 7/2005 |
| JP | 2005-190135 | | 7/2005 |
| JP | 2005-196699 | | 7/2005 |
| JP | 2005-202488 | | 7/2005 |
| JP | 2005190066 | * | 7/2005 |
| JP | 2006-92149 | | 6/2006 |
| WO | 02/03215 | | 10/2002 |

OTHER PUBLICATIONS

K. Kanda et. al., "The implementation scheme of a reference monitor on Windows", IPSJ SIG Technical Report, vol. 2003 No. 80, p. 41-46, Information Processing Society of Japan, Aug. 4, 2003.

K. Suzuki et. al., "An Adaptive Data Protection Method based on Contexts of Data Access in Privacy-Aware Operating System Salvia", Domestic Paper, vol. 47 No. SIG3 (ACS13), p. 1-15, Information Processing Society of Japan, May 15, 2006.

* cited by examiner

FORMAT SAMPLE OF DETERMINATION POLICY

| API TYPE | PERFORM IMPERATIVE PROCESSING | POLICY VERSION |
|---|---|---|
| FILE GENERATION | EXECUTE DETECTION PROCESSING | 1.0 |
| FILE TRANSFER | PROHIBIT TRANSFER TO REMOVABLE DISK IF RISK OF SUBJECTED FILE IS "HIGH" | 1.1 |
| FILE DELETION | DELETE ENTRY IN HISTORY DB | 1.2 |
| ⋮ | ⋮ | ⋮ |

FIG. 4

| FILE NAME | SIZE | DATE AND TIME | USER DETERMINATION | DATE AND TIME OF DETERMINATION |
|---|---|---|---|---|
| C:¥a.txt | 8KB | 2005-05-10 | HIGH | 2005-05-15 |
| C:¥b.pdf | 10KB | 2005-09-20 | NONE | 2005-09-21 |
| C:¥c.xml | 5KB | 2005-09-10 | LOW | 2005-09-21 |
| ⋮ | ⋮ | ⋮ | ⋮ | ⋮ |

FIG. 7

METHOD AND APPARATUS FOR SUPPORTING PERSONAL INFORMATION PROTECTION

CROSS-REFERENCE TO RELATED APPLICATIONS

This application claims priority under 35 U.S.C. 119(a)-(d) from Japanese Patent Application No. JP2006-116548 entitled "INFORMATION PROCESSING APPARATUS FOR SUPPORTING PERSONAL INFORMATION PROTECTION" filed Apr. 20, 2006, the entire disclosure of which is incorporated herein by reference for all purposes

BACKGROUND

This invention relates to protecting personal information in a computer system.

In recent years, leaking of corporate confidential information and personal information has become more prevalent, and measures against such leaking have been strongly demanded. For example, in Japan the law "Act on the Personal Information Protection" became fully effective in April 2005, and specification and secure data management of personal information have been required of any corporation which retains personal information of at least 5000 people for at least six months.

Personal information subject to the law includes not only data stored inside an electronic commerce web server and a database, but also data inside a notebook personal computer (PC) carried by a corporate employee. In a PC carried by a sales person, for example, a customer list, a staff register, a conference participant list and the like are stored, and such information also needs to be considered as personal information subject to personal information management. Backup files and older versions of files containing such personal information exist in various locations in a file system of a PC, and often the owner of the PC is not aware of the locations of the personal data on the computer. Additionally, the hard disk sizes of some of the recent PCs exceed 100 GB, making it difficult to manually detect the data.

End user monitoring systems, thin-client systems, document management systems and the like have been put into practical use as technologies for personal information management. However, these techniques have not come into full-scale use because they suffer from problems such as reduced operability for a user, and high costs for installation of a dedicated server, replacement of business software, and the like.

An access control has been proposed which determines whether to permit or prohibit access to each of the personal information in a personal information management system. This determination is made by referring to a personalized access control list where various access rights to each piece of personal information are determined. The access rights are set up by an individual who is a subject of each piece of the personal information (see, for example, Japanese Patent Application Laid-open No. JP2005-196699). However, all the above techniques for enhancing a security level of a PC require alteration of an existing operating system and/or an application program in the PC.

If personal information is detected by a software tool which semi-automatically detects personal information, personnel costs can be considerably reduced. Normally, such a detection tool is executed by a user or a system administrator at certain intervals (for example, once a month). When such a usage frequency is assumed, however, a time lag (for example, for a maximum of one-month period in the foregoing example) can occur between a time when data containing personal information is actually generated, and a timing of detection by using the tool. As a result, it is difficult to perform real-time risk management.

SUMMARY

In general, in one aspect, the invention provides methods and apparatus, including computer program products, implementing and using techniques for causing an application program containing personal information to operate on an operating system. It is detected whether the application program outputs, transfers or generates data to the outside of a storage region of the application program. A real-time determination is made as to whether or not the data is subject to personal information management. Processing of the application program is continued, interrupted or corrected based on a result of the determination by the personal information management determining unit. Personal information is detected by scanning contents of the data when the determination of the personal information management determining unit indicates that the data is subject to personal information management. Personal information detected in the step of detecting personal information is displayed to a user required to manage the personal information. A result of the determination is input according to a level of risk against the data on the user. Contents of the determination result is stored as a history. A risk indicator of the risk against the data is computed. The computed risk indicator is displayed to the user.

The invention can be implemented to include one or more of the following advantages. The invention makes it possible to provide an information processing apparatus, an information processing method and a computer program product thereof which detect processing on personal information data in real time, and which thus support protection of personal information.

The details of one or more embodiments of the invention are set forth in the accompanying drawings and the description below. Other features and advantages of the invention will be apparent from the description and drawings, and from the claims.

DESCRIPTION OF DRAWINGS

FIG. 4 is a format sample of determination policies in accordance with one embodiment of the invention.

FIG. 7 is a format sample stored in a user determination history storage unit in accordance with one embodiment of the invention.

Like reference symbols in the various drawings indicate like elements.

DETAILED DESCRIPTION

The invention will be described below by way of example and with reference to FIGS. 1 to 7. It should be understood that the following exemplary embodiments do not limit the scope of the invention as recited in the claims, and also that not all combinations of characteristics described in the embodiments below are necessary for the invention to be operable.

Figure 1:
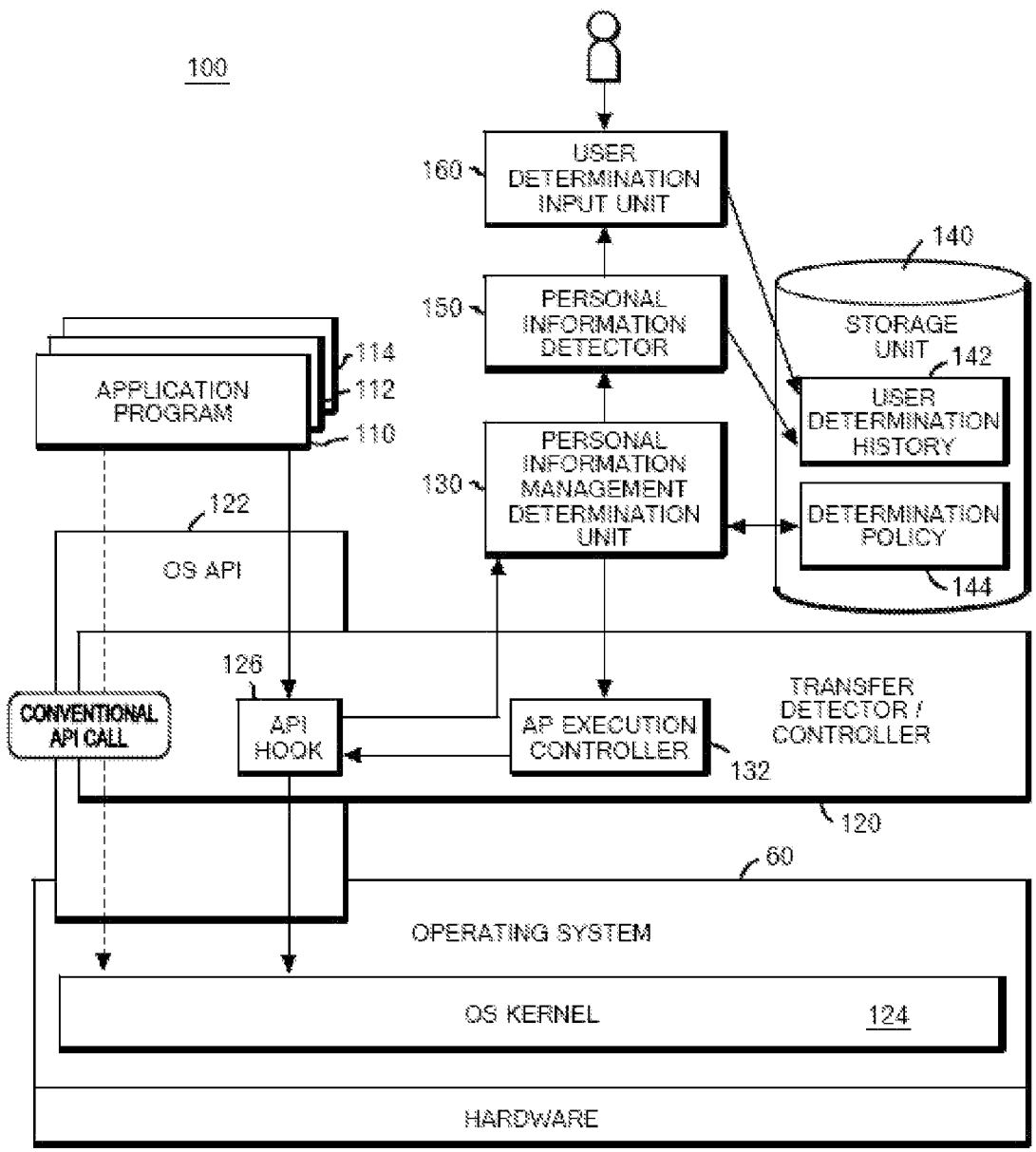
FIG. 1 is a schematic block diagram showing a configuration of an information processing apparatus in accordance with one embodiment of the invention.

FIG. 1 is a schematic block diagram showing a configuration of the information processing apparatus 100 in accordance with one embodiment of the invention. The information processing apparatus 100 includes an operating system 60 which operates on hardware shown in FIG. 11, which will be described later in detail; a transfer detector/controller 120 for detecting whether any one of application programs 110, 112 and 114 which operate on the operating system 60 outputs, transfers or generates data to the outside of a storage region of any one of the application programs 110, 112 and 114; and a personal information management determining unit 130 for determining in real time whether or not the data is subject to personal information management.

Furthermore, as shown in FIG. 1, the information processing apparatus 100 includes a personal information detector 150 for detecting personal information by scanning contents of the data if the determination by the personal information management determining unit 130 indicates that there is a need to subject the data to personal information management; a display unit for displaying to a user who needs to manage personal information, the personal information being detected by the personal information detector 150; an input unit 160 through which a result of the determination according to a level of risk against the data against the user is input; a user determination history storage unit 142 for storing, as a history, contents of the determination result; and a determination policy storage unit 144 for storing determination policies. The display unit is composed of a display device 1022 of FIG. 11, which will be described below in further detail, and corresponding software.

The transfer detector/controller 120 includes an API hook 126 and an application program execution controller 132 (an AP execution controller 132) for continuing, interrupting or correcting processing of any one of the application programs 110, 112 and 114 based on the determination result by the personal information management determining unit 130. The user determination history storage unit 142 and the determination policy storage unit 144 for storing determination policies can be stored in the same storage unit 140 as shown in FIG. 1, or may be stored separately.

The operating system 60 includes an OS kernel 124. An OS API 122 acts as a bridge between each of the application programs 110, 112 and 114 and the operating system 60.

Figure 2:
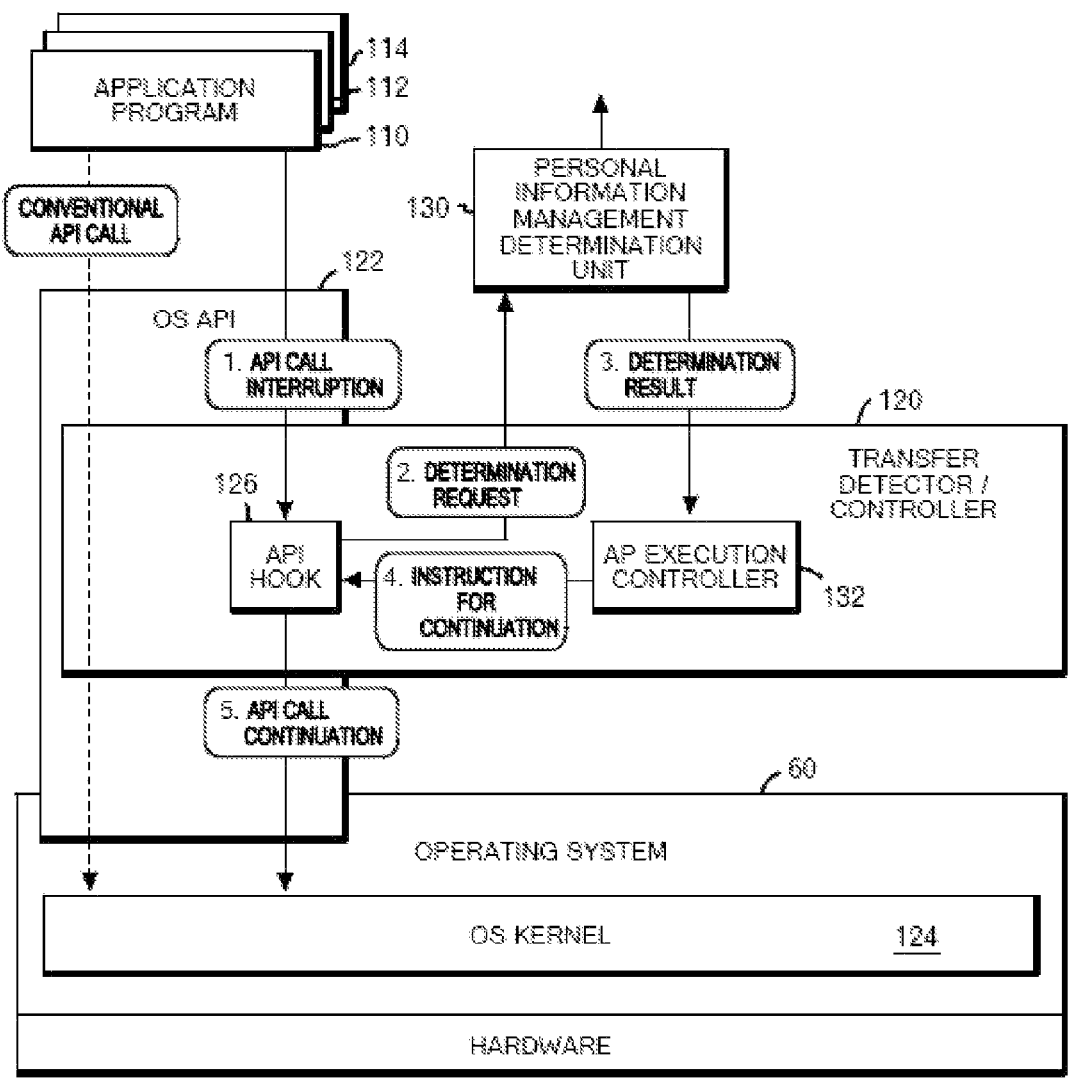
FIG. 2 is a schematic block diagram showing a flow of a control path of the information processing apparatus in accordance with one embodiment of the invention.
Figure 3:
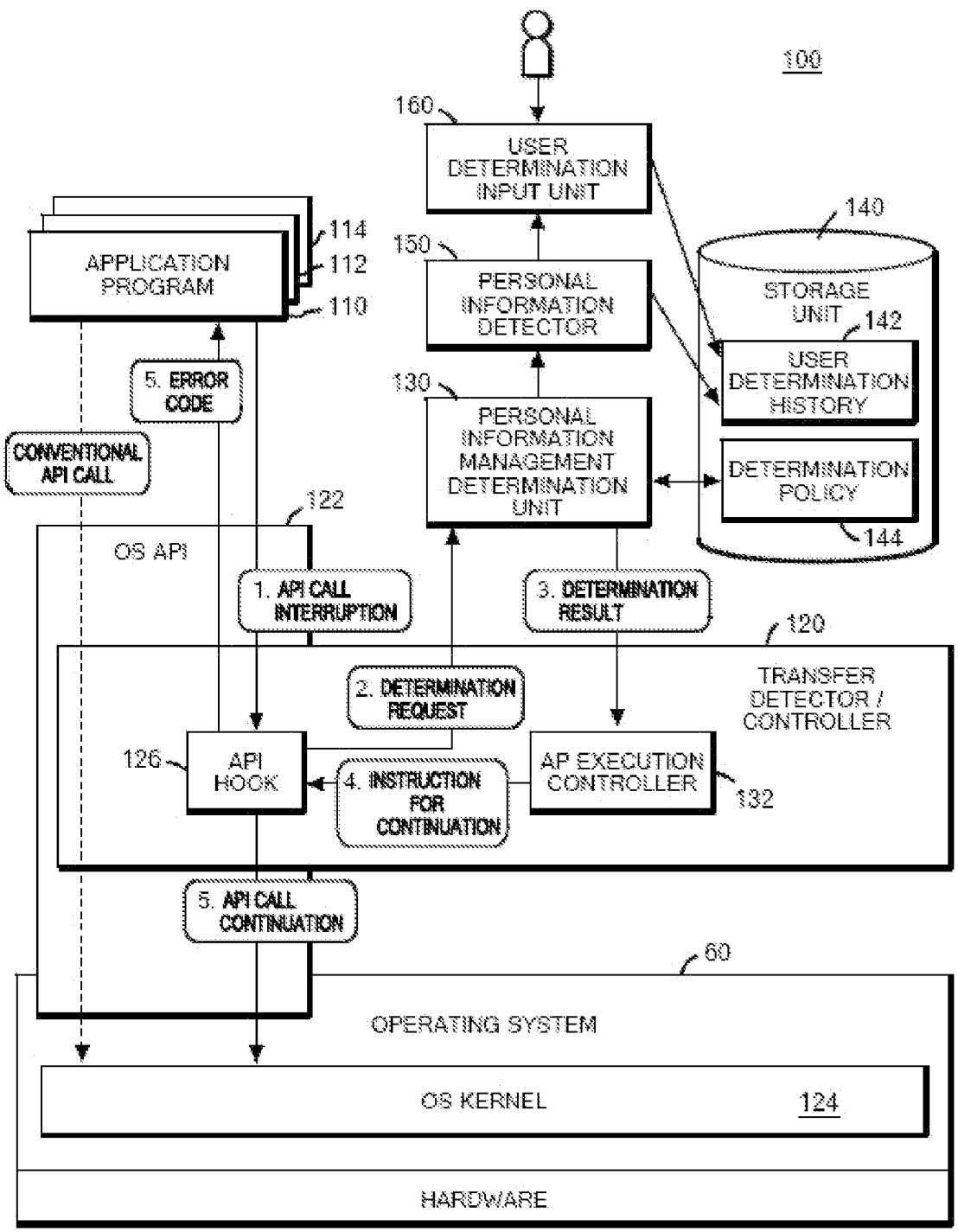
FIG. 3 is a schematic block diagram showing a flow of a control path of the information processing apparatus in accordance with one embodiment of the invention.

FIGS. 2 and 3 are diagrams showing flows of control paths of the information processing apparatus in accordance with one embodiment of the invention. First, the API hook 126 is contained in the OS API 122. Under normal conditions, the role of the API hook 126 is to drag out the control path to be passed as-is to the OS kernel 124 at a lower level. "1. API CALL INTERRUPTION" indicated by an elliptical frame in FIG. 2 corresponds to this action.

Subsequently, the control is passed to the personal information management determining unit 130 ("2. DETERMINATION REQUEST" indicated by an elliptical frame), from which a result is returned to the AP execution controller 132 ("3. DETERMINATION RESULT" indicated by an elliptical frame). The AP execution controller 132 instructs the API hook 126 to perform continuation, interruption, correction and the like of processing ("4. INSTRUCTION FOR CONTINUATION" indicated by an elliptical frame). In a case of continuation of processing, the API hook 126 passes the control to the OS kernel 124 at a lower level as if nothing has happened ("5. API CALL CONTINUATION" indicated by an elliptical frame).

FIG. 3 is a diagram showing a flow of the control path in a case of the interruption of processing. As shown in FIG. 3, with reference to the determination result from the personal information management determining unit 130, the AP execution controller 132 instructs the API hook to perform the interruption. The API hook 126 returns an error code to any applicable one of the application program 110 and the like ("5. ERROR CODE" indicated by an elliptical frame in FIG. 3).

The transfer detector/controller 120 is described in detail in the document "Development of Technologies for Real Time Monitoring/Controlling of Program in PC and Application thereof to Information Security Systems" (Sanehiro Furuichi et al., Symposium on Cryptography and Information Security 2006, the Institute of Electronics, Information and Communication Engineers), which is hereby incorporated by reference in its entirety. In the following description, the transfer detector/controller 120 will be described as a file, which is one example of the data.

FIG. 4 is a format sample of determination policies in accordance with one embodiment of the invention. The determination policies are obtained by describing, as policy rules, an algorithm of the personal information management determining unit 130. Here, the determination policy is a policy for calling up the personal information detector 150 in a case where an API of a type of file generation is called. The determination policy causes, in a case where an API regarding file transfer is called, the application program execution controller 132 to prohibit the transfer of the file into a removable device such as a USB if the relevant file is treated as personal information (a result of whether or not the file is treated accordingly is obtained by searching the user determination history storage unit 142). If an API regarding file deletion is called, the determination policy is a policy for deleting an applicable history from the user determination history storage unit 142. By describing processing in association with the API, it is possible to flexibly determine how personal information is to be treated. In the personal information management determining unit 130, the determination policies can be implemented by using any one of the C++® and Java® programming languages, or alternatively an interpreter can be called, which interprets and executes the determination policies.

If it is determined in the personal information management determining unit 130 that detection processing of personal information is necessary, the personal information detector 150 is called next.

Figure 5:
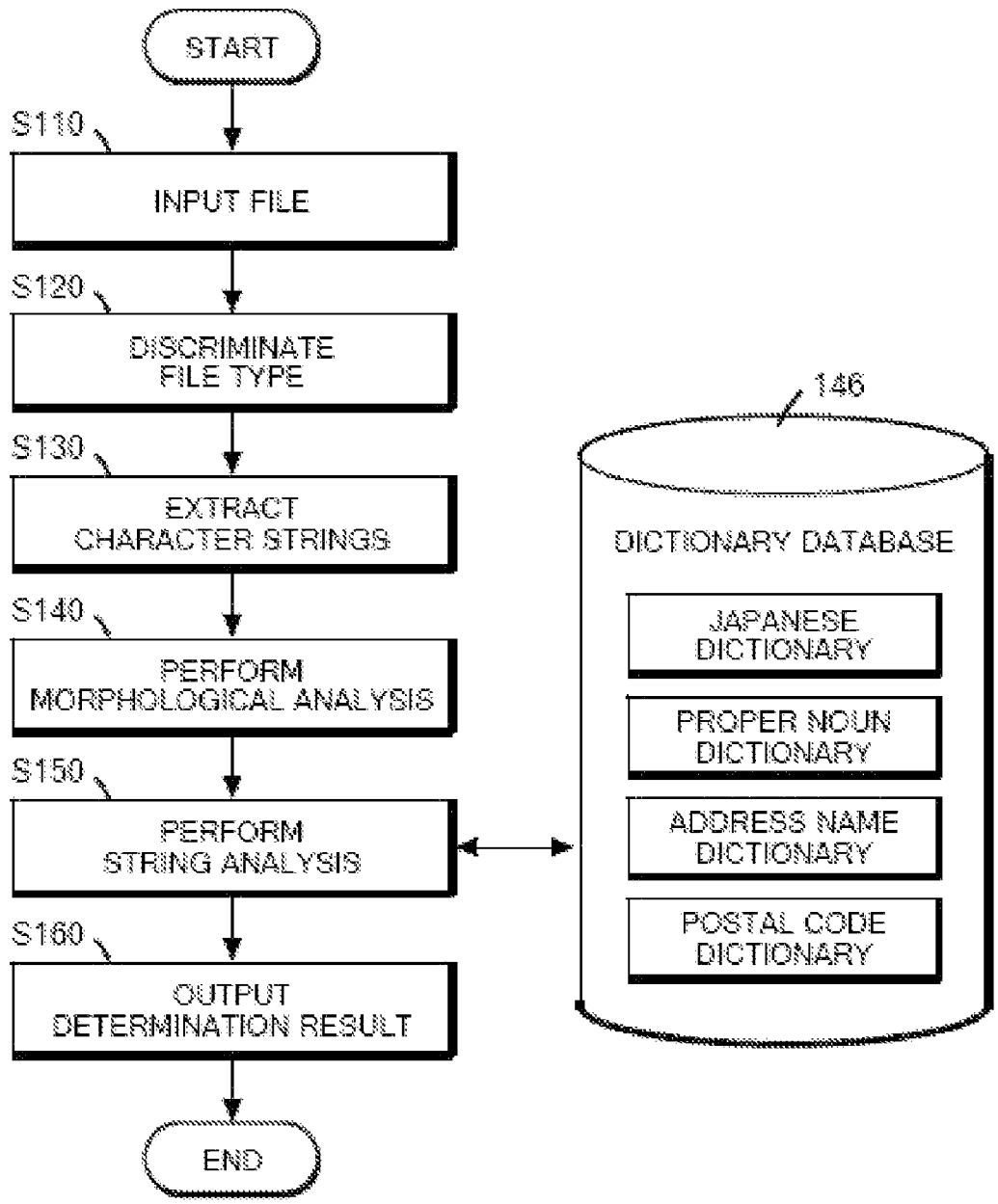
FIG. 5 is a flowchart showing operations of a personal information detector in accordance with one embodiment of the invention.

FIG. 5 is a flowchart showing operations of the personal information detector 150 in accordance with one embodiment of the invention. First, a file, for which detection of personal information has been determined to be necessary, is input into the personal information detector 150 (step S110). Subsequently, file type discrimination is performed on the input file (step S120). Character strings are then extracted in accordance with a file type (step S130). Morphological analysis is performed on the extracted character strings (step S140). The morphological analysis is defined as follows. In a case of Japanese, the morphological analysis refers to word segmentation processing, that is, word-by-word segmentation of a sentence which is written without spaces, and which utilizes Japanese phonetic syllables and Chinese characters. In a case of a language such as English, the morphological analysis means analysis on word inflexion. One example of specific techniques for the morphological analysis can be found, for example, in Chapter 1 of "Natural Language Processing" under the editorial leadership of Hozumi Tanaka (the Institute of Electronics, Information and Communication Engineers).

String analysis is then performed on each of analyzed morphemes (step S150). The string analysis is performed by comparing each of the morphemes with a Japanese dictionary, a proper noun dictionary, an address name dictionary, and a postal code dictionary, which are stored in a dictionary database storage unit. After the string analysis, a result of the determination is output to the display unit. The display unit includes the display device 1022 of FIG. 11, and the corresponding software.

Figure 6:
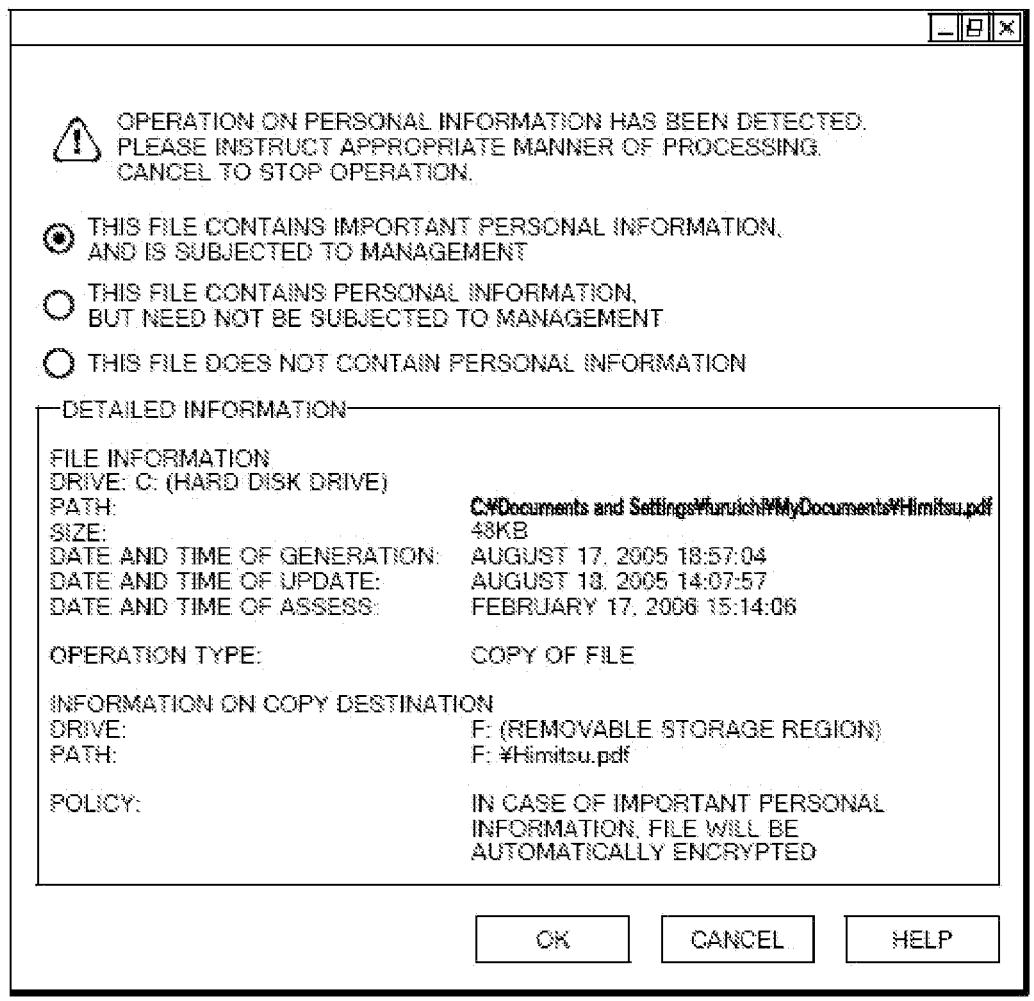
FIG. 6 is a screenshot of contents detected by the personal information detector in accordance with one embodiment of the invention.

FIG. 6 is a display example of contents detected by the personal information detector 150. When a personal information file is detected, a relevant screen as shown in FIG. 6 is displayed. The display device 1022 shows contents on the screen, which includes detailed information about the file. The display prompts the user to manage the file. As a response to the screen shown in FIG. 6, the user is prompted to determine: whether or not personal information in the file is important personal information, and is subject to the management; whether or not, while personal information is contained therein, the personal information needs to be managed; or whether or not personal information is not contained.

The user checks the contents of the detailed information, and then determines to what kind of management the personal information is subject. The user can input, via a user determination input unit 160, a content of the determination by selecting a button in FIG. 6, and by operating a lower part of the screen.

FIG. 7 is a format sample stored in the user determination history storage unit 142. Items include a computer resource (a file name or the like) subject to the management; a size of the computer resource; date and time of file generation or of update; a level of determination by a user; and date and time when the determination by the user has been made. The first three pieces of information are used as indicators in searching for the computer resource. If these three items are found, it is possible to determine whether the user has already made a decision about the file. The level of determination indicates a degree of risk against personal information. The risk is high when the level is indicated as "High," and the risk is low when the level is indicated as "Low." When the risk is determined to be low, checking processing for personal information protection can be considered as unnecessary during subsequent processing on the computer resource. When the risk is determined to be high, the user is prompted to check the computer resource for personal information protection at the subsequent detections on the computer resource. However, in a case where there are no changes in the file size, and the date and time of file generation or update, a response having been taken at the time of previous detection can be considered as effective. Accordingly, there is no problem if determination by the user is omitted in this case. These pieces of information are used in the personal information management determining unit 130. "None" is stored in the user determination history storage unit 142 in a case where the personal information detector 150 does not detect any personal information. "High/Low" and the like are stored as the determination result by the user.

In the above described manner, by performing personal information detection at a timing when a file is generated, transferred or deleted, it is possible to minimize risk management in a corporation, and to provide an information processing system which is less burdensome to the user when the user uses the tool.

Figure 8:
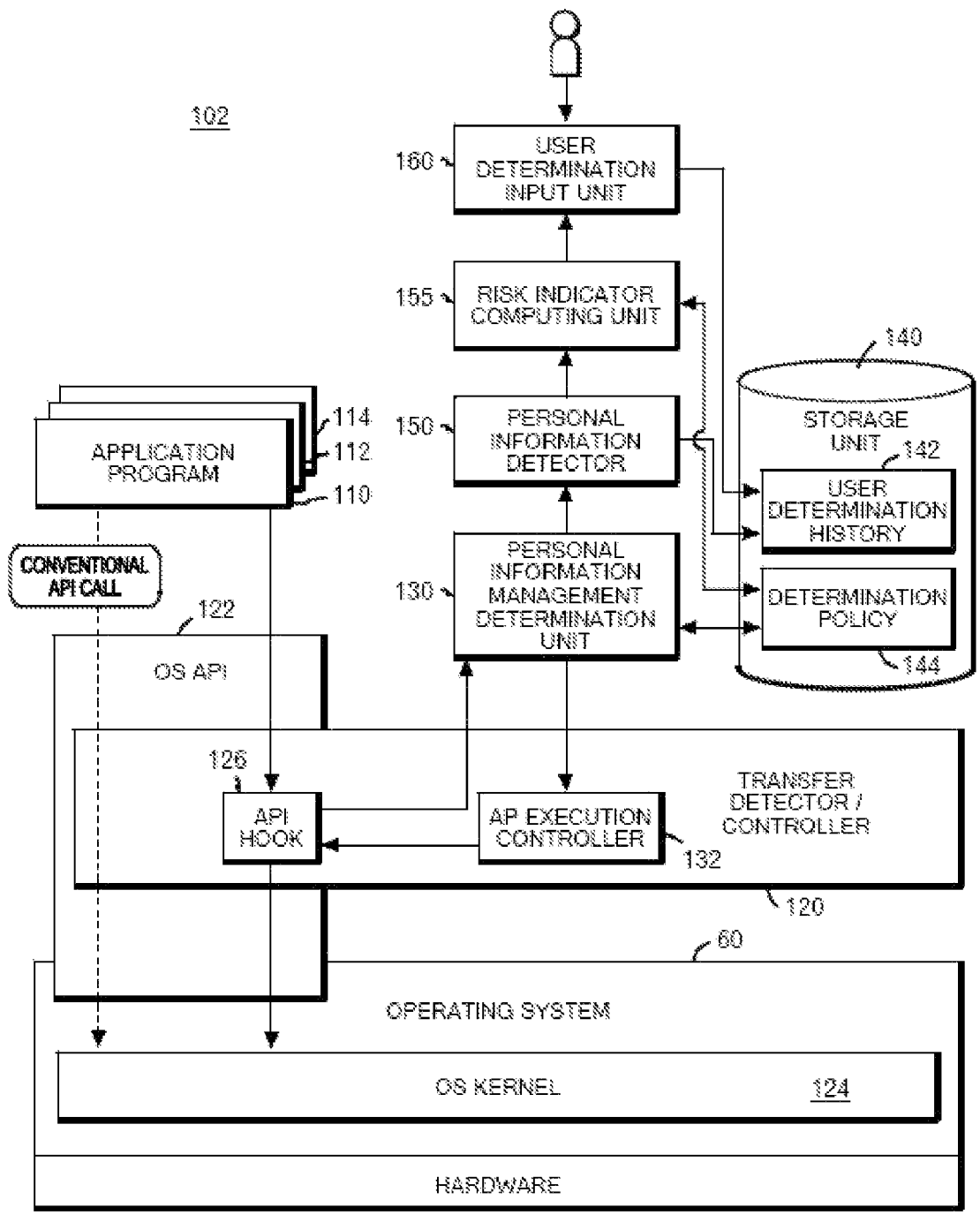
FIG. 8 is an example of a modified information processing apparatus 100 which further includes a risk indicator computing unit 155 in accordance with one embodiment of the invention.

FIG. 8 shows another embodiment where the information processing apparatus 100 further includes a risk indicator computing unit 155. As shown in FIG. 8, the information processing apparatus 100 includes the risk indicator computing unit 155 for computing an indicator of risk against a file. When a personal information file is detected by the personal information detector 150, the file is input to the risk indicator computer unit 155. The risk indicator is computed for the input file with reference to the determination policies previously stored in the storage unit 140. Among personal information files, one including a password is at a high risk. On the other hand, information which is a mere name list, and which does not contain addresses or telephone numbers, is at a relatively low risk. These risks are computed in accordance with results of the detection by the personal information detector 150. The computed risk indicator is displayed for the user with the display device 1022 (described later with reference to FIG. 11).

Figure 9:
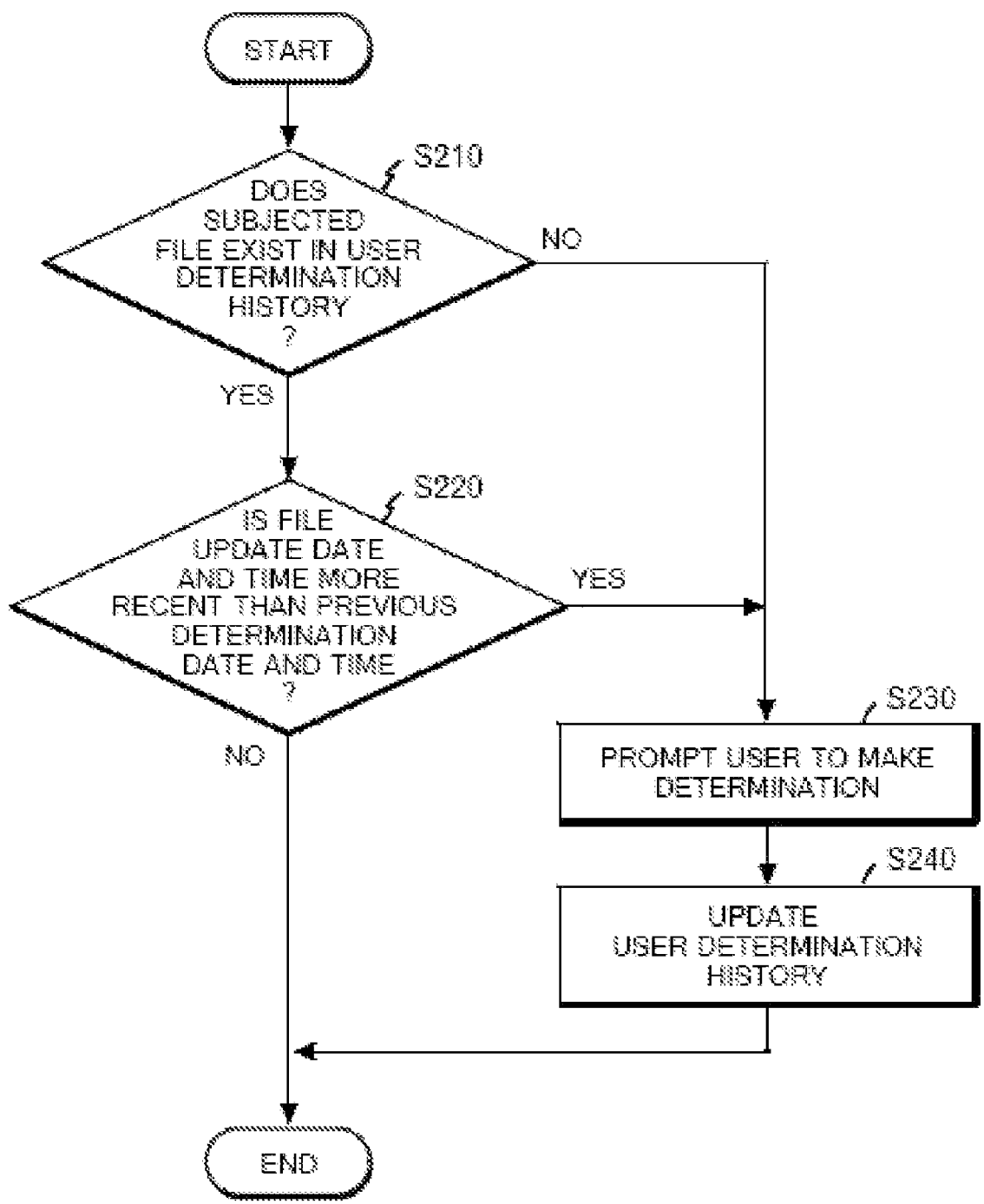
FIG. 9 is a flowchart showing a minimization mechanism which minimizes a request to a user for intervention in accordance with one embodiment of the invention.

FIG. 9 is a flowchart of a minimization mechanism unit for minimizing a request to the user for intervention. The minimization mechanism unit, which is further included in the personal information detector 150, minimizes a number of times of the subsequent detection on personal information, and of subsequent request to the user to intervene in the personal information, by utilizing the history stored in the user determination history storing unit 142.

When a file subject to the management is detected by the personal information detector 150, the file is called up by the minimization mechanism unit. It is checked whether or not the file exists in the user determination history storage unit 142 stored in the storage unit 140 (step S210). In a case of "YES" at S 210, it is further checked whether or not file update date and time is more recent than previous determination date and time by searching the related items in the user determination history storage unit 142 (step S220). When the file update date and time is more recent than previous determination date and time, the user is prompted to make determination (step S230). Thereafter, when the user determination is input through the user determination input unit 160, the user determination history storage unit 142 is updated in accordance with the content (step S240).

When the file update date and time is not more recent than previous determination date and time (in case of "NO" in step S220 in FIG. 9), the minimization mechanism unit terminates its operation. That is, without displaying anything on the display unit for the user, the flow proceeds to processing performed by an application program having been originally executed. In this manner, it is possible to minimize a number of times of the subsequent detection on personal information, and of subsequent request to the user to intervene in the personal information.

In addition, the following function can be further included in the personal information management determining unit 130. Specifically, the function determines how to treat the detected personal information according to an attribute of an output destination of the file, the response being based on the predetermined determination policy previously stored in the user policy storage unit 144. As has been described in FIG. 3, levels of importance are different among cases where: the file is output to a printer; the file is transferred to a storage unit within the same corporation; and the file is generated on a clipboard. By storing this information in the determination policies, it is possible to minimize the requests to the user for intervention.

Furthermore, by changing the processing in accordance with a progress status of the application program, it is also possible to reduce the request to the user for intervention, and to thereby make responding to the request more manageable for the user. That is, different results may be given as the determination policy in accordance with status of an application program which has called up the API. For example, determination results may be weighted differently when a window for the application program is active and when the window is non-active. Additionally, a status of an application program different from the application program which has called up the API may be reflected in the determination policy. For example, determination results may be made stricter for file operation by another program and for clipboard operation only during a period when a certain program A has a particular file or URL open. Alternatively, a previous history may be reset, and the user may be prompted to make determination again.

Figure 10:
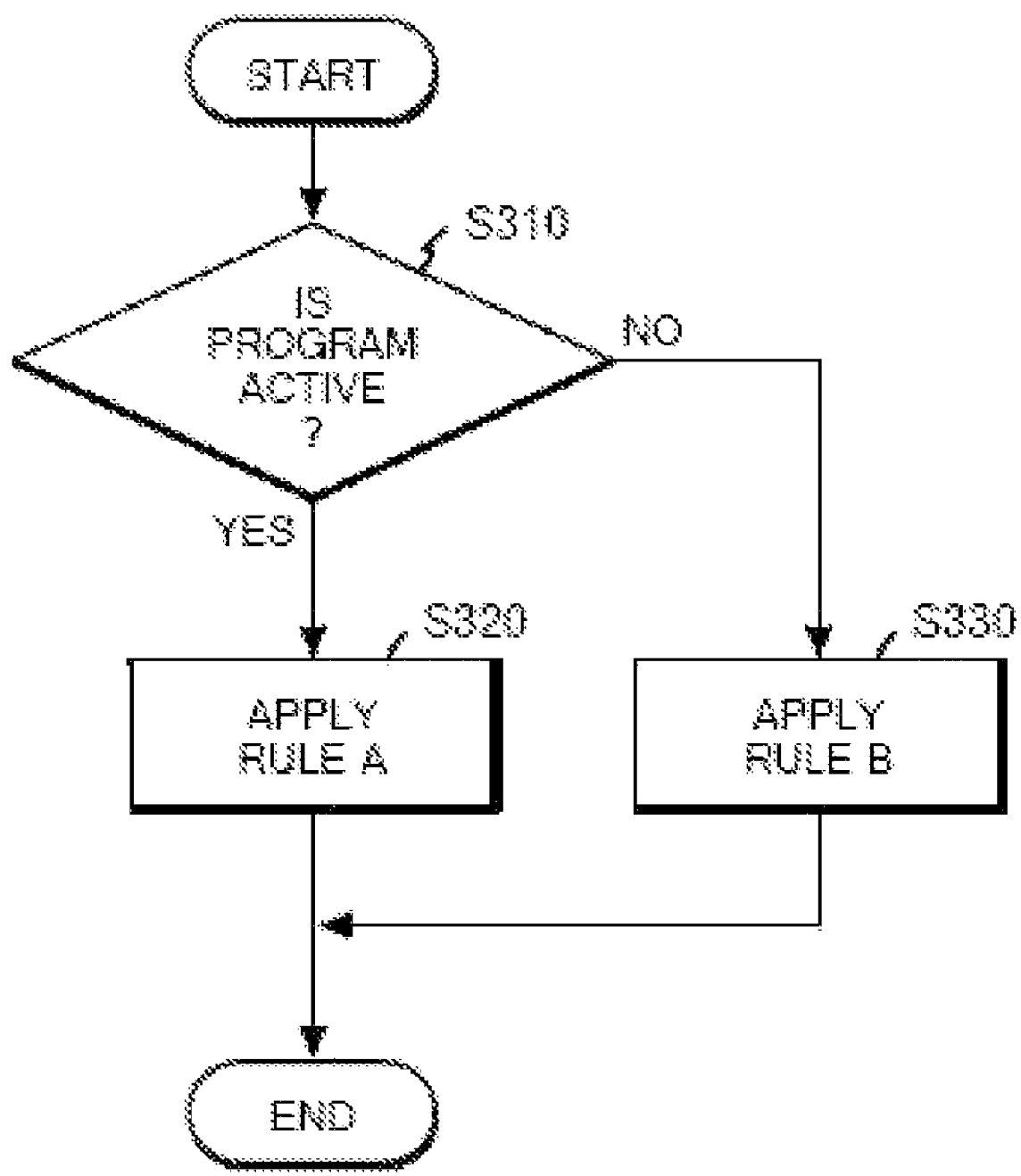
FIG. 10 is a flowchart showing an example of processing in a case where a determination is made in accordance with a progress status of an application program in accordance with one embodiment of the invention.

FIG. 10 is a flowchart showing an example of processing when a determination is made in accordance with a progress status of an application program. When processing is shifted to the personal information management determining unit 130, it is checked whether or not the application program is active (step S310). When the application program is active, a rule A is applied (step S320). When it is not active, a rule B is applied (step S330). The function dynamically determines, in accordance with the progress status of the application program, which one of the rules is to be applied. A number of these rules may be more than two.

Figure 11:
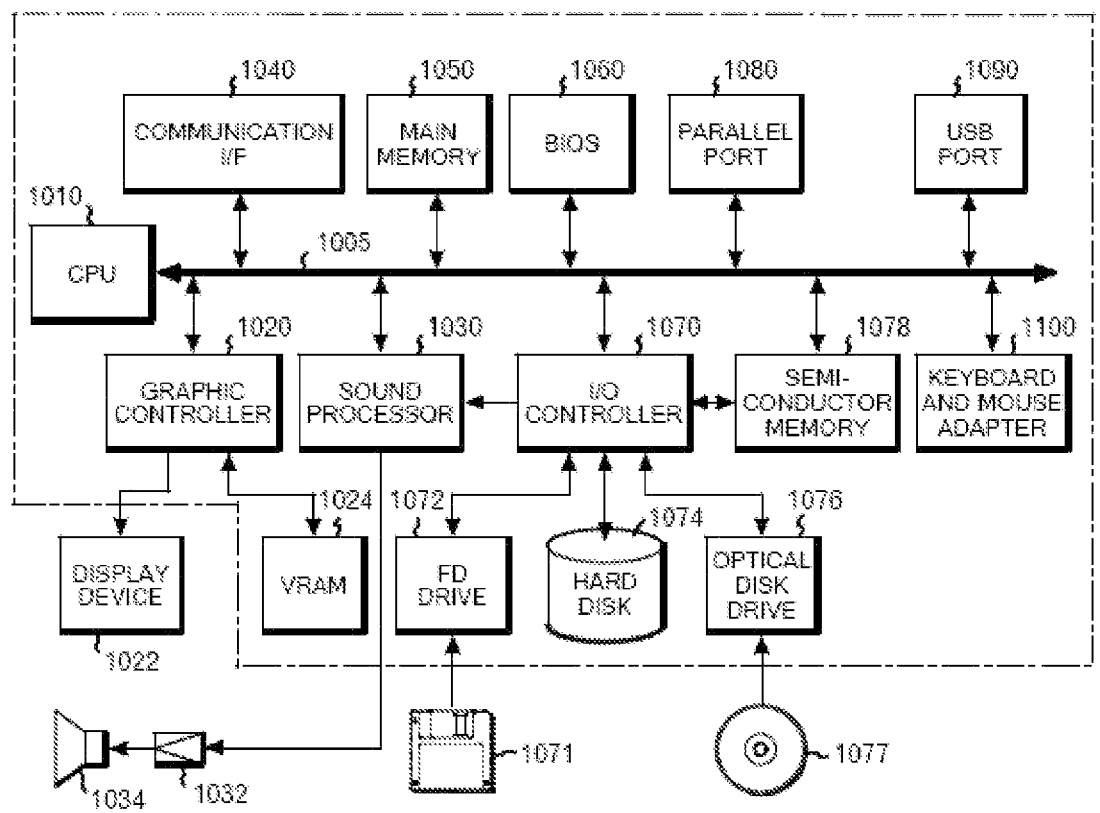
FIG. 11 shows a hardware configuration of the information processing apparatus in accordance with one embodiment of the invention.

FIG. 11 shows an example of a hardware configuration of the information processing apparatus 100. The information processing apparatus 100 includes a CPU (Central Processing Unit) 1010, a bus line 1005; a communication I/F 1040, a main memory 1050, a BIOS (Basic Input Output System) 1060, a parallel port 1080, a USB port 1090, a graphic controller 1020, a VRAM 1024, a sound processor 1030, an I/O controller 1070, and input means 1100 such as a keyboard and a mouse adapter. Storage means such as a flexible disk drive 1078, a hard disk 1074, an optical disk drive 1076, and a semiconductor memory 1078 can be connected to the I/O controller 1070. Any one of these storage means can be used as the storage unit 140.

An amplifier circuit 1032 and a speaker 1034 are connected to the sound processor 1030. In addition, the display device 1022 is connected to the graphic controller 1020.

The BIOS 1060 includes a boot program executed by the CPU 1010 at the startup of the information processing apparatus 100; a program dependent on hardware of the information processing apparatus 100; and the like. The flexible disk (FD) drive 1072 reads a program or data from a flexible disk 1071, and supplies the data to the main memory 1050 or the hard disk 1074 through the I/O controller 1070.

Any one of a DVD-ROM drive, a CD-ROM drive, a DVD-RAM drive and a CD-RAM drive, for example, can be used as the optical disk drive 1076. In this case, an optical disk 1077 for a corresponding one of the drives needs to be used. The optical disk drive 1076 may read a program or data from the optical disk 1077, and supply the data to the main memory 1050 or to the hard disk 1074 via the I/O controller 1070.

The computer program product provided to the information processing apparatus 100 is stored in a recording medium such as the flexible disk 1071, the optical disk 1077, and a memory card to be provided by a user. By being read out from the recording medium, or by being downloaded via the I/O controller 1070, the computer program product is installed and executed in the information processing apparatus 100. Operations which the computer program product causes an information processing apparatus to perform are the same as the operations in the information processing apparatus 100 which have been described in association with FIGS. 1 to 10.

The above-described computer program product may be stored in an external storage medium. Any one of a tape medium and a magneto-optical recording medium, such as an MD, can be used as the storage medium in addition to the flexible disk 1071, the optical disk 1077 and a memory card. The computer program product may be provided to the information processing apparatus 100 via a communication network by using, as the recording medium, a storage device such as a hard disk or an optical disk library which are provided to a server system connected to a dedicated communication line or the Internet.

The above-described examples, descriptions have been given mainly with reference to an information processing apparatus. However, it is possible to cause a computer to have the same functions as the above-described functions of the information processing apparatus in the following way. Specifically, the computer can be operated as the information processing apparatus by installing, into the computer, a program provided with the functions having been described in connection with the information processing apparatus. Accordingly, the information processing apparatus having been described as one embodiment of the invention can be achieved also by means of an information processing method and a computer program product thereof.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention has been described using the above exemplary embodiments. However, a technical scope of the invention is not limited to the scope described in the above-described embodiments. On the contrary, a variety of alterations and improvements can be added to the above-described embodiments. Moreover, it is obvious from description in the scope of claims that aspects to which such alterations or improvements are added can also be incorporated in the technical scope of the invention. For example, the embodiment has been described with the operating system being Windows2000/XP®. However, the invention can be achieved with the operating system being a different OS such as, for example, UNIX®.

Although the preferred embodiment of the invention has been described in detail, it should be understood that various changes, substitutions and alternations can be made therein without departing from spirit and scope of the inventions as defined by the appended claims.

The invention claimed is:

1. An information processing method which causes an application program containing personal information to operate on an operating system, comprising:
   detecting that the application program outputs, transfers or generates data to the outside of a storage region of the application program;
   determining in real time that the data is subject to personal information management;
   interrupting processing of the application program based on a result of the determination that the data is subject to personal information management;
   detecting personal information by scanning contents of the data after determining that the data is subject to personal information management;
   displaying detected personal information on a display device;
   prompting a user to manage the data subject to personal information management;
   determining that the user has made a decision regarding data subject to personal information management based on size of a file, date and time of file generation, date and time of a user determination, and a user level determination;
   removing low risk personal information data from subsequent prompting of the user for risk assessment;
   computing a level of risk relating to the personal information about the data;
   storing the level of the risk as the risk history per data;
   prompting a user to check a computer resource for personal information protection for high levels of risk;
   determining a risk indicator about the personal information according to a predetermined determination policy when the personal information is detected in the personal information detecting step, and for displaying the determined risk indicator; and
   outputting the risk indicator with a display device.

2. The information processing method of claim 1, wherein the risk history is stored in association with the data; and an updated date and time of the data store is compared with a previously determined date and time, and an input of the level of the risk relating to the data is received.

3. The information processing method of claim 1, wherein, the subjection of the data to personal information management is determined based on a predetermined determination policy stored in association with the attribute of the data output end.

4. The information processing method claim 1, wherein the method further comprises
   differentiating the determination that the data is subject to personal information management according to activity of the application program.

* * * * *